US008821711B2

(12) United States Patent
Taylor et al.

(10) Patent No.: US 8,821,711 B2
(45) Date of Patent: Sep. 2, 2014

(54) PROCESS TO RECYCLE END OF LIFE CDTE MODULES AND MANUFACTURING SCRAP

(75) Inventors: Patrick Taylor, Lakewood, CO (US); Makko DeFilippo, Boston, MA (US)

(73) Assignee: Colorado School of Mines, Golden, CO (US)

( * ) Notice: Subject to any disclaimer, the term of this patent is extended or adjusted under 35 U.S.C. 154(b) by 186 days.

(21) Appl. No.: 13/527,841

(22) Filed: Jun. 20, 2012

(65) Prior Publication Data

US 2012/0325676 A1     Dec. 27, 2012

Related U.S. Application Data

(60) Provisional application No. 61/499,293, filed on Jun. 21, 2011.

(51) Int. Cl.
| | |
|---|---|
| *C25B 1/00* | (2006.01) |
| *C25C 1/16* | (2006.01) |
| *C22B 17/00* | (2006.01) |
| *C01B 19/02* | (2006.01) |
| *C22B 17/02* | (2006.01) |
| *C22B 7/00* | (2006.01) |

(52) U.S. Cl.
CPC . *C22B 17/02* (2013.01); *C25C 1/16* (2013.01); *C22B 7/006* (2013.01); *C25B 1/00* (2013.01); *C22B 7/008* (2013.01)
USPC ............. 205/615; 75/401; 75/743; 423/109; 423/508; 205/560

(58) Field of Classification Search
None
See application file for complete search history.

(56) References Cited

U.S. PATENT DOCUMENTS

| | | | |
|---|---|---|---|
| 5,779,877 A | 7/1998 | Drinkard, Jr. et al. | |
| 5,779,887 A | 7/1998 | Rector et al. | |
| 6,129,779 A | 10/2000 | Bohland et al. | |
| 6,391,165 B1 * | 5/2002 | Bohland et al. | ............... 204/198 |
| 6,572,782 B2 | 6/2003 | Campo et al. | |
| 7,731,920 B2 | 6/2010 | Fthenakis et al. | |
| 2010/0189612 A1 * | 7/2010 | Fthenakis et al. | ............... 423/24 |

OTHER PUBLICATIONS

Tolley et al, Recovering Cadmium and Tellurium From Thin-Film Photovoltaic Device Scrap, U.S. Bureau of Mines, Report of Investigations 9588, 1995, pp. 1-24.*
Rhee et al., "Tellurium recovery from cemented tellurium with minimal waste disposal," Hydrometallurgy, 1999, vol. 53(2), pp. 189-201.
Fthenakis et al., "Recycling of CdTe Photovoltaic Modules: Recovery of Cadmium and Tellurium," Sep. 21, 2006, available at www.bnl.gov/pv/files/pdf/abs_192.pdf, 3 pages.
Ha et al., "Electrowinning of tellurium from alkaline leach liquor of cemented Te," J. Appl. Electrochem., 2000, vol. 30, pp. 315-322.

* cited by examiner

*Primary Examiner* — Harry D Wilkins, III
(74) *Attorney, Agent, or Firm* — Sheridan Ross P.C.

(57) ABSTRACT

A method for recycling of thin film Cadmium Telluride photovoltaic modules at the end of their life, and manufacturing scrap, has been developed. This method allows for minimum glass fine generation, requires little or no acid compared to other methods, and generates a pure cadmium and tellurium product at recoveries in excess of about 80 percent. In addition, the process allows for the recovery of a clean soda-lime plate glass product.

20 Claims, 13 Drawing Sheets

Particles used for oxide penetration depth analysis

PROCESS TO RECYCLE END OF LIFE CDTE MODULES AND MANUFACTURING SCRAP

CROSS REFERENCE TO RELATED APPLICATION

This application claims priority under 35 U.S.C. §119(e) to U.S. Provisional Patent Application Ser. No. 61/499,293 filed Jun. 21, 2011 which is incorporated herein in its entirety by reference.

FIELD OF THE INVENTION

The invention relates to the recycling of parts and machinery coated with cadmium, tellurium or a combination of both to recycle the substrate and the coating materials. In particular, the present invention relates to the recycling of end of life cadmium telluride photovoltaic modules and manufacturing scrap.

BACKGROUND

Photovoltaic (PV) technology is a growing field, especially given the climate change and energy challenges related to traditional fields of energy. Though solar energy is clean as far as the energy being generated, the materials being used to manufacture the modules are not clean and must be disposed of at their end of life. Currently, there is no industry-wide acceptable way of recycling the waste produced by end of life photovoltaic modules. Thus, a need exists to effectively recycle the end of life waste and manufacturing scrap produced by photovoltaic modules.

SUMMARY

The present invention relates to methods to remove coatings from substrates. In particular, the method relates to removing a CdTe coating from a photovoltaic module so that the components may be recycled. This method allows for minimum glass fine generation, requires little or no acid compared to other methods, and generates a pure tellurium product and a cadmium by-product at recoveries between about 45% to an excess of about 90 percent. In addition, the process allows for the recovery of a clean soda-lime plate glass product.

The present invention takes advantage of the different solubility of CdO and $TeO_2$ in alkaline solutions following oxidation of the CdTe coating material. Upon successful conversion of the CdTe substrate to $CdTeO_3$ ($CdO.TeO_2$), $TeO_2$ becomes soluble in the alkaline solution while the CdO remains as a solid. Following a solid liquid separation, the components may be purified and recovered.

An embodiment of the present invention is directed to a method of recycling coated substrates, comprising subjecting a substrate comprising a thin film to an oxidation in an oxygen containing environment to produced an oxidized thin film, subjecting the oxidized thin film to an alkaline leach to produce a solid containing cadmium and a solution containing tellurium, and recovering tellurium from the solution containing tellurium.

Another embodiment of the present invention is directed to a method of recycling a photovoltaic module comprising a substrate, a coating, and a secondary substrate, the method comprising subjecting the photovoltaic module to delamination to remove the secondary substrate, subjecting the photovoltaic module to an oxidation in an oxygen containing environment to produced an oxidized coating, subjecting the oxidized coating to an alkaline leach to produce a solid containing cadmium and a solution containing tellurium, and recovering tellurium from the solution containing tellurium.

Another embodiment of the present invention is directed to a method of recycling a photovoltaic module, comprising subjecting the photovoltaic module to a delamination in a nitrogen furnace, wherein the photovoltaic module comprises a secondary substrate and a coated substrate, removing a secondary substrate from the coated substrate, subjecting the coated substrate to a media blast until a thin film is recovered, subjecting the thin film to a oxidation in an oxygen containing atmosphere furnace to produced an oxidized thin film, leaching the oxidized thin film in an alkaline leach to produce a sludge containing cadmium and a solution containing tellurium, electrowinning the sludge containing cadmium to produce a cadmium product, electrowinning the solution containing tellurium to produce a tellurium product, recovering the alkaline leach, and recycling the recovered alkaline leach to the leaching step.

DETAILED DESCRIPTION

Figure 1:
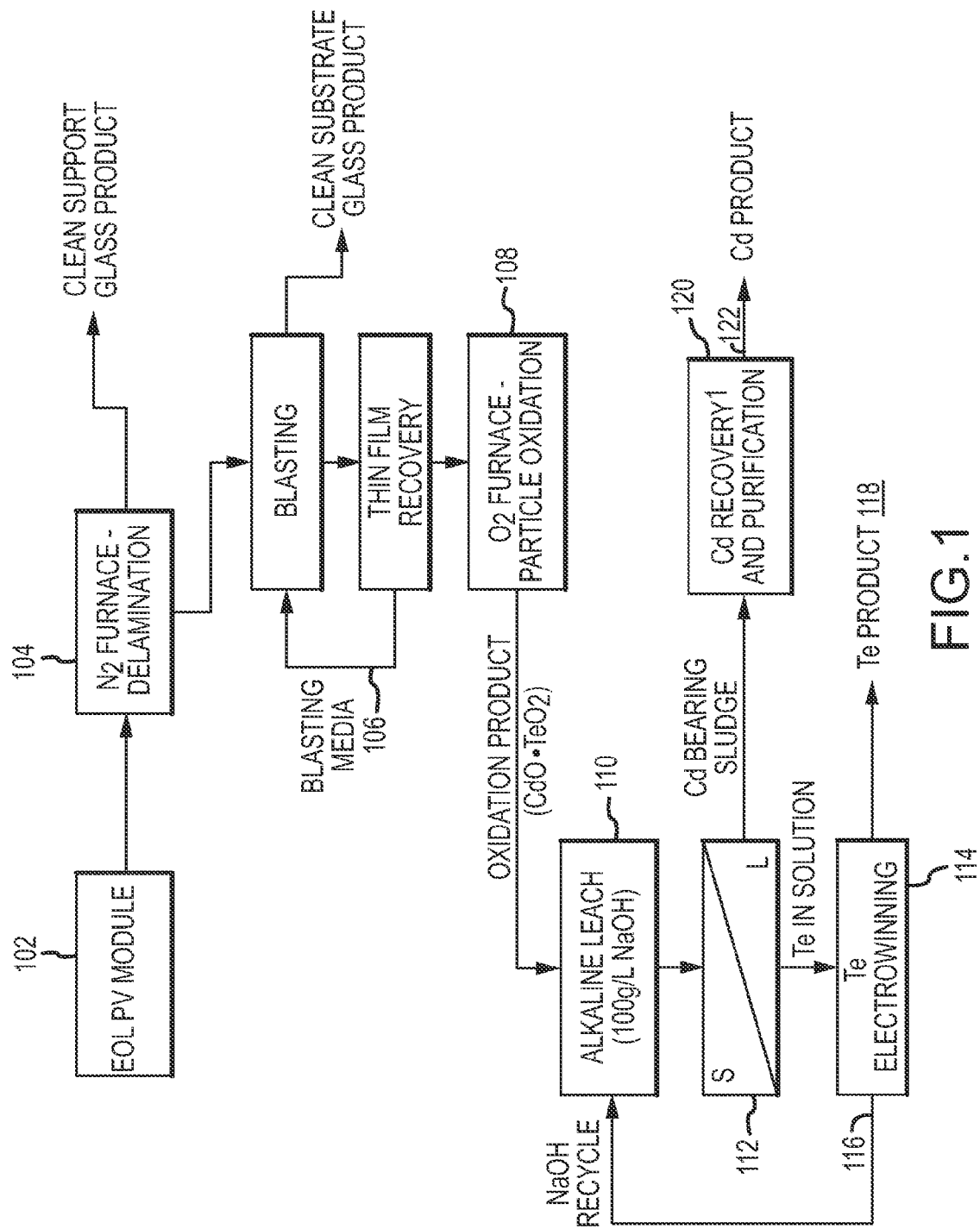
FIG. 1 illustrates a recycling process utilizing media blasting.

The present invention relates to a method to recycle cadmium tellurium photovoltaic modules and manufacturing scrap. In particular, the method is used to recycle end of life cadmium tellurium photovoltaic modules and manufacturing scrap.

Substrates

The substrates of the present invention may be any material that may be coated with cadmium telluride, cadmium or tellurium. In one embodiment, the substrate is glass, in particular soda-lime glass. In another embodiment, the substrate is coated with a cadmium telluride coating and attached to a secondary option glass substrate. The optional secondary glass substrate may be the same material as the substrate, or it may be a different material. In other embodiments, the substrate is metal.

The coatings could have been applied to the substrate in any suitable manner. Though cadmium tellurium coatings are typically applied in a uniform manner for use with photovoltaic modules, the coatings may be removed using the present invention even if they are not uniform. Thus, it is possible to use the present invention to recycle parts where the coating was not uniformly applied.

Cadmium Processing

Cadmium may be recovered using an embodiment of the claimed invention. Cadmium is a known carcinogen and environmental precautions should be followed in order to prevent the Cadmium from leaving the process via any unwanted pathways, including but not limited to, a closed loop process for liquid solutions, liquid waste containment, and scrubbing of any generated off-gas during thermal treatment of the film.

Preprocessing

Delamination

In the event that the coating is between two substrate materials, the secondary substrate should be removed prior to removing of the coating. The secondary substrate may be removed in one embodiment by delamination. By way of example, a photovoltaic module has coating material between the substrate that it is attached to a secondary substrate. The secondary substrate may be removed prior to further processing. To remove the secondary substrate, the entire module may be placed into an inert atmosphere, typically composed of nitrogen, argon, or helium, at between about 400° C. and about 450° C., and preferably about 425° C. for no more than about 30 minutes. This process will delaminate the secondary substrate from the coated substrate. The process may be repeated until the secondary substrate has delaminated from the coated substrate.

Media Blasting

Optionally, the coated substrate may be further treated in order to remove contaminates or glass pieces remaining following the delamination step. Contaminates may be removed by media blasting the coated substrate. In addition, this method may be used to separate the CdTe thin film from the glass substrate. The media may be any abrasive material and may be wet or dry. Examples of suitable media include but are not limited to sand, dry ice, ice, soda, bead, or fluid.

The media blast may also be used to remove the substrate from the thin coating. In this instance, the coating is removed from the glass substrate such that the glass substrate may be removed and recycled. In this embodiment, secondary processing of the thin film via oxidation and alkaline leaching would remain unchanged.

Oxidation

Following the optional preprocessing steps, the coating is oxidized by subjecting it to an oxygen containing atmosphere at between about 650° C. and about 750° C. for no more than about 2 hours. Preferably, the oxygen containing atmosphere is about 700° C. The oxidation results in an oxidized coating. For example, a CdTe coating is converted to a $CdTeO_3$ ($CdO.TeO_2$) coating and the Tellurium is at an oxidized state that is soluble in an alkaline environment.

Comminution

Following the oxidation step, the oxidized coating and substrate may be comminuted, which generally includes the steps of feeding substrate fragments, or whole modules into a comminution device. The comminution breaks the oxidized coating substrate into a plurality of similarly sized pieces. The comminution may be performed in any suitable method, for example using a grinding roll, roller presses, ball mills, rod mills, hammer mills, or jaw crushers. Preferably, the comminution breaks the substrate but prevents the generation of glass fines.

Alkaline Leach

Alkaline leaching removes Tellurium from the oxidized coating. In the case where the coating is $CdTeO_3$, the alkaline leaching removes the Tellurium in solution, leaving behind a Cadmium bearing residue. The alkaline leaching conditions may be between 10 g/L and 300 g/L pulp density, preferably about 100 g/L pulp density; between about 25° C. and about 90° C., preferably about 80° C.; between about 50 g/L NaOH and about 150 g/L NaOH, preferably about 100 g/L NaOH solution. The total leach time should be between about 20 minutes and about 240 minutes, preferably between about 20 minutes to about 30 minutes. The NaOH may be recycled. Controllers may be used to monitor the properties of the recycled NaOH and may be combined with unused NaOH. Alternatively, the NaOH may be unused.

In another embodiment, the alkaline leach also consists of abrasion stripping during the leaching step. The abrasion stripping manually removes the oxidized coating as it is submerged in the alkaline leaching solution. The abrasion stripping may be done by any suitable means, including using a steel brush, wool, or other abrasive material to remove the coating. In this embodiment, the alkaline leach solution is between about 50 g/L NaOH and about 150 g/L NaOH, preferably about 100 g/L NaOH.

In another embodiment, the leaching may also consist of abrasion scrubbing. Abrasion scrubbing allows for other pieces coated by the substrate in the solution to abrade each other in the alkaline leaching solution. The pieces are stirred within the alkaline leaching solution in a manner gentle enough to minimize breaking the glass in the solution. In this embodiment, the alkaline leach solution is between about 50 g/L NaOH and about 150 g/L NaOH, preferably about 100 g/L NaOH solution.

Solid Liquid Separation

Following the alkaline leach, the solids containing Cadmium and liquids containing Tellurium are separated from each other using any suitable means, including but not limited to centrifuges, filters and settling/decantation.

Electrowinning

Following the solid-liquid separation, the liquid solution containing Tellurium is processed to separate and recycle the NaOH and the Tellurium using electrowinning, which generally describes the process of applying an electric current across two submersed electrodes, preferably flat stainless steel plates, to cause Te metal plating at the cathode. Electrowinning allows the recovery of a pure Tellurium product from the alkaline leach liquid containing Tellurium. Conditions for electrowinning should be between about 20 mA/cm2 and about 30 mA/cm2 current density, and preferably are about 25 $mA/cm^2$ current density. The duration of the electrowinning may vary. The recovery of the Tellurium increases as the duration of the electrowinning increases. Preferably, the electrowinning is conducted for up to about 5 hours. During electrowinning, NaOH is regenerated so that the overall requirements for NaOH in the leaching stage are theoretically met by the amount generated and recycled. It is expected that some make up would be required.

In another embodiment, impurities contained in the tellurium bearing solution may be removed from the solution via any suitable means, including but not limited to ion exchange columns, cementation and precipitation.

Cadmium Recovery

Following the solid-liquid separation, the solid containing Cadmium is processed to recover the Cadmium from the Cadmium bearing sludge using an acidic solution, including but not limited to a nitric acid or sulfuric acid. The acid solution may be treated to precipitate the impurities present in the solution. Cadmium is electrowon from the acidic solution. The preferred current density for electrowinning is about 25 $mA/cm^2$. The duration of the electrowinning may vary. The recovery of the Cadmium increases as the duration of the electrowinning increases. Preferably, the electrowinning is conducted for up to about 5 hours.

Figure 2:
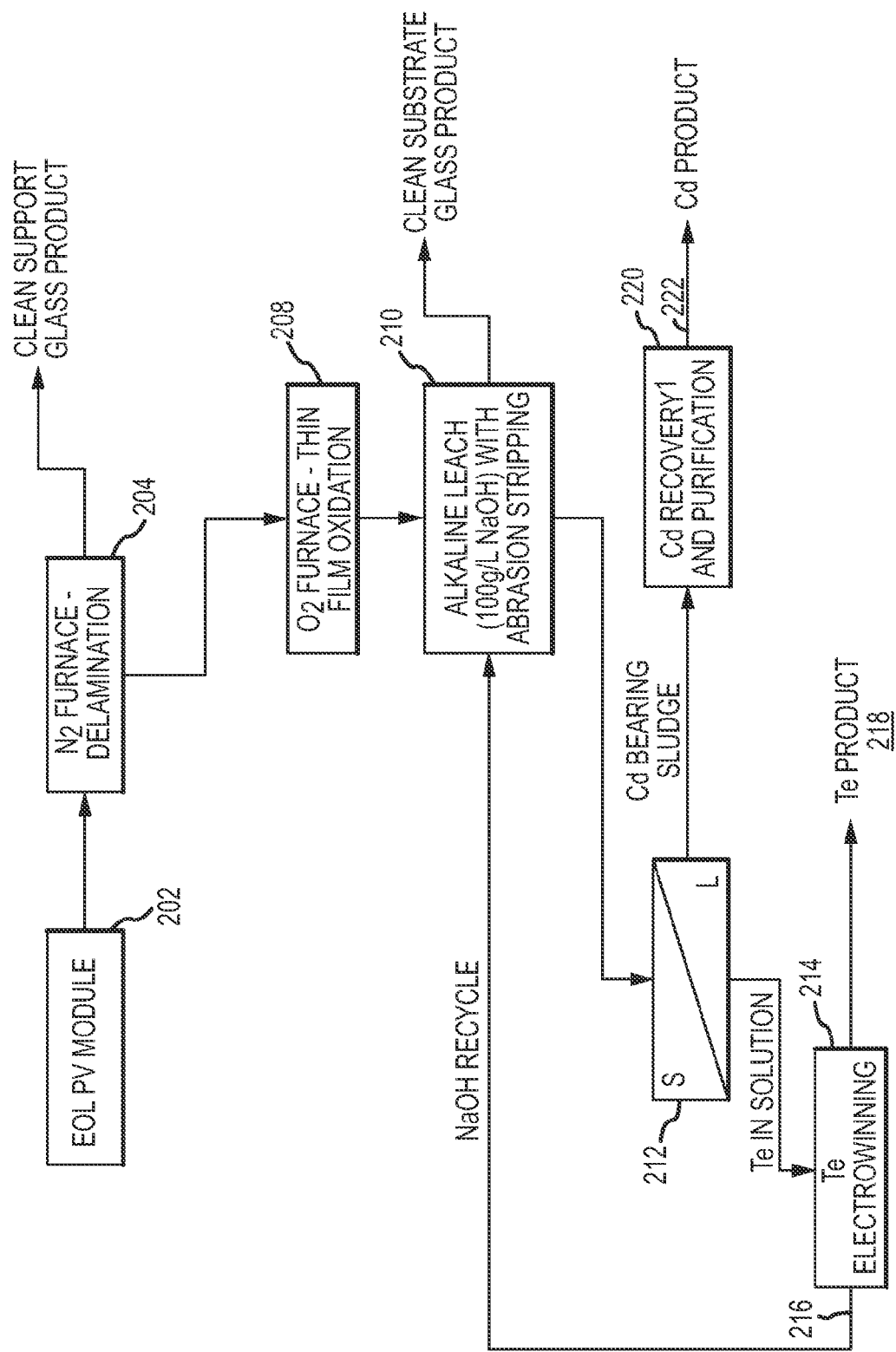
FIG. 2 illustrates a recycling process utilizing abrasion stripping.
Figure 3:
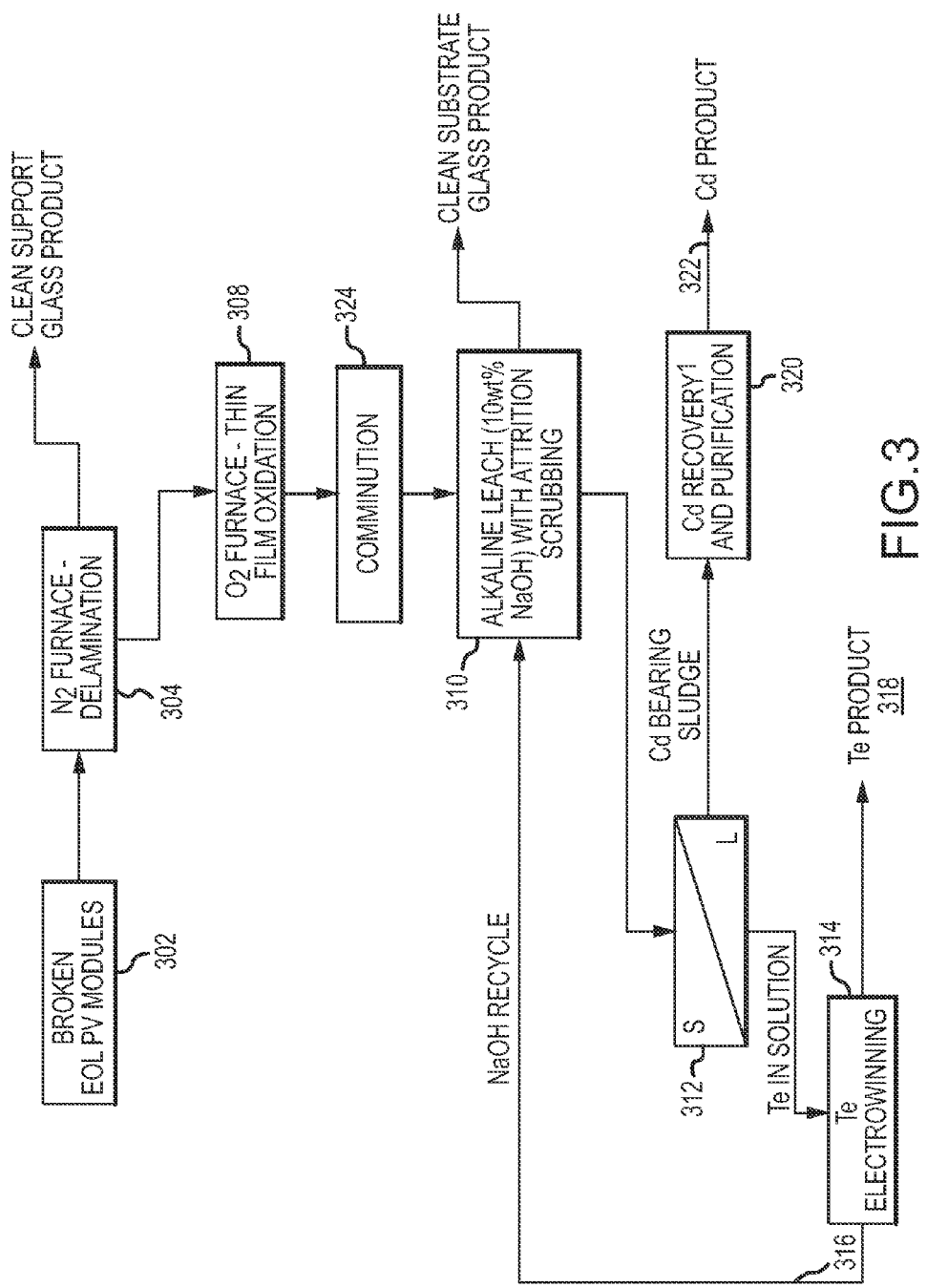
FIG. 3 illustrates a recycling process utilizing comminution and attrition scrubbing.

Turning to the figures of the present invention, FIGS. 1-3 show three different methods of removing CdTe coatings from a glass substrate. In each embodiment, a secondary substrate is also present.

FIG. 1 illustrates an embodiment of the present invention where a photovoltaic module is recycled. The end of life photovoltaic module 102 is first subjected to delamination in a $N_2$ furnace 104. The secondary substrate is removed and the remaining coated substrate of the photovoltaic module is processed further. The coated substrate is subjected to media blasting 106, where the substrate is continually blasted until the thin film is recovered. The thin film is subjected to particle oxidation in an $O_2$ containing atmosphere furnace 108, which produces an oxidation product. The oxidation product is subjected to an alkaline leach 110 followed by a solid-liquid separation 112. The cadmium bearing sludge is further processed by electrowinning 120 to produce a Cadmium product 122. The liquid Tellurium in solution is electrowon 114 to produce the Tellurium product 118. The NaOH 116 recovered during the electrowinning step is recycled to the alkaline leach 110.

FIG. 2 illustrates another embodiment of the present invention where a photovoltaic module is recycled. The end of life photovoltaic module 202 is first subjected to delamination in a $N_2$ furnace 204. The secondary substrate is removed and the remaining coated substrate of the photovoltaic module is processed further. The coated substrate is subjected to oxidation in an $O_2$ furnace 208. The oxidized coating is subjected to an alkaline leach with abrasion stripping 210. The substrate is removed. After the solid-liquid separation 212, the cadmium bearing sludge is further processed by electrowinning 220 to produce a Cadmium product 222. The liquid Tellurium in solution is electrowon 214 to produce the Tellurium product 218. The NaOH 216 recovered during the electrowinning step is recycled to the alkaline leach 210.

FIG. 3 illustrates another embodiment of the present invention where a photovoltaic module is recycled. The end of life photovoltaic module 302 is first subjected to delamination in a $N_2$ furnace 304. The secondary substrate is removed and the remaining coated substrate of the photovoltaic module is processed further. The coated substrate is subjected to oxidation in an $O_2$ furnace 308. The oxidized coating is comminuted 324. The comminuted oxidized coating is subjected to an alkaline leach with attrition scrubbing 310. After the solid liquid separation 312, the cadmium bearing sludge is further processed by electrowinning 320 to produce a Cadmium product 322. The liquid Tellurium in solution is electrowon 314 to produce the Tellurium product 318. The NaOH 316 recovered during the electrowinning step is recycled to the alkaline leach 310.

As discussed throughout the specification, the process may be used to recycle end of life cadmium tellurium photovoltaic modules. It will be apparent to those in the art that this process may be used for other compounds containing tellurium where the oxidation state can be transformed (+4) with thermal treatment. Such material could include, but is not limited to, manufacturing waste created during manufacturing of cadmium tellurium photovoltaic modules such as: CdTe overspray material, research or testing modules, out of specification modules, or material generated during the "edge-delete" process.

EXAMPLES

Example 1

Figure 4:
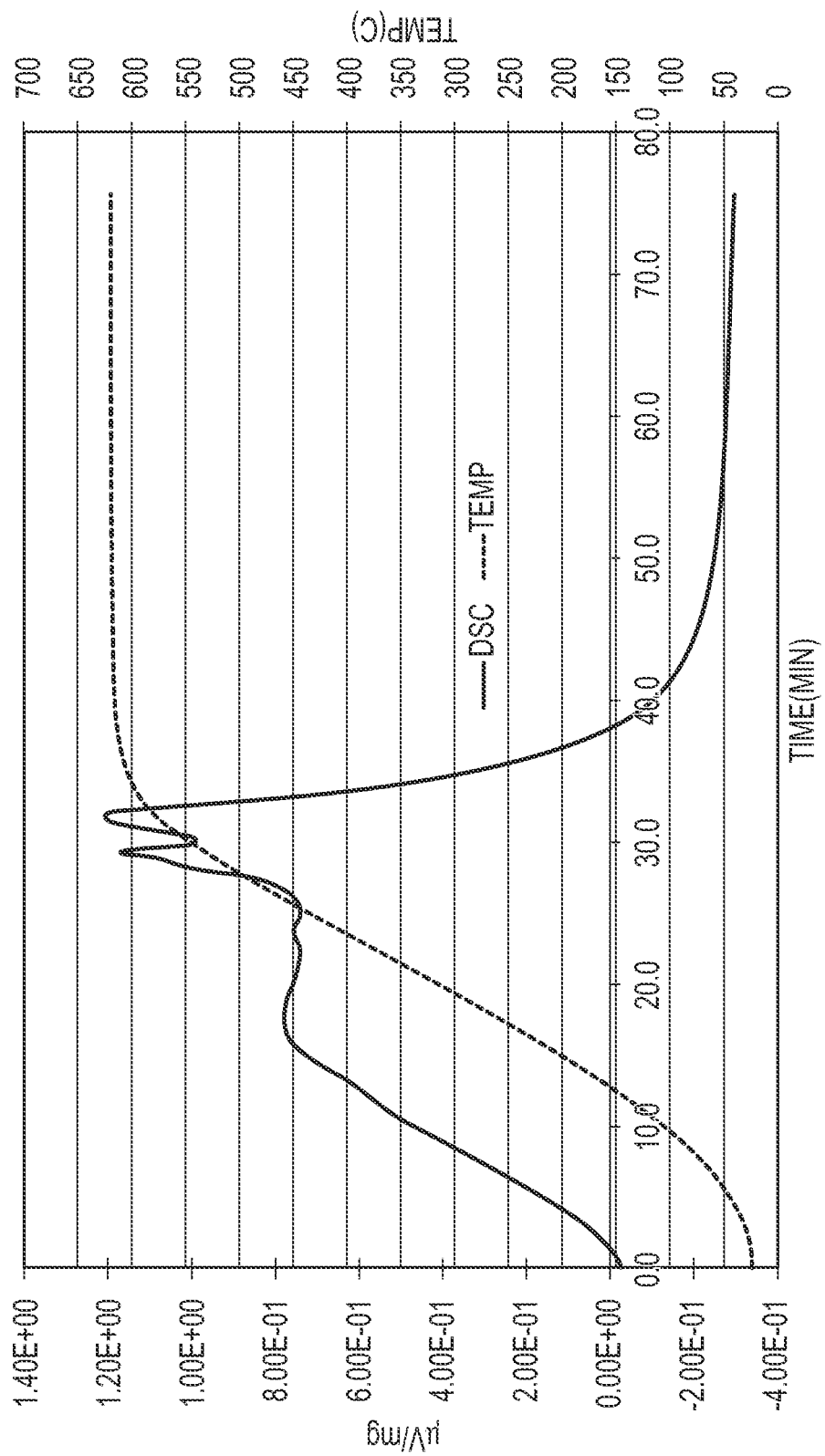
FIG. 4 illustrates a Differential Scanning Analysis of a CdTe/CdS sample.
Figure 5:
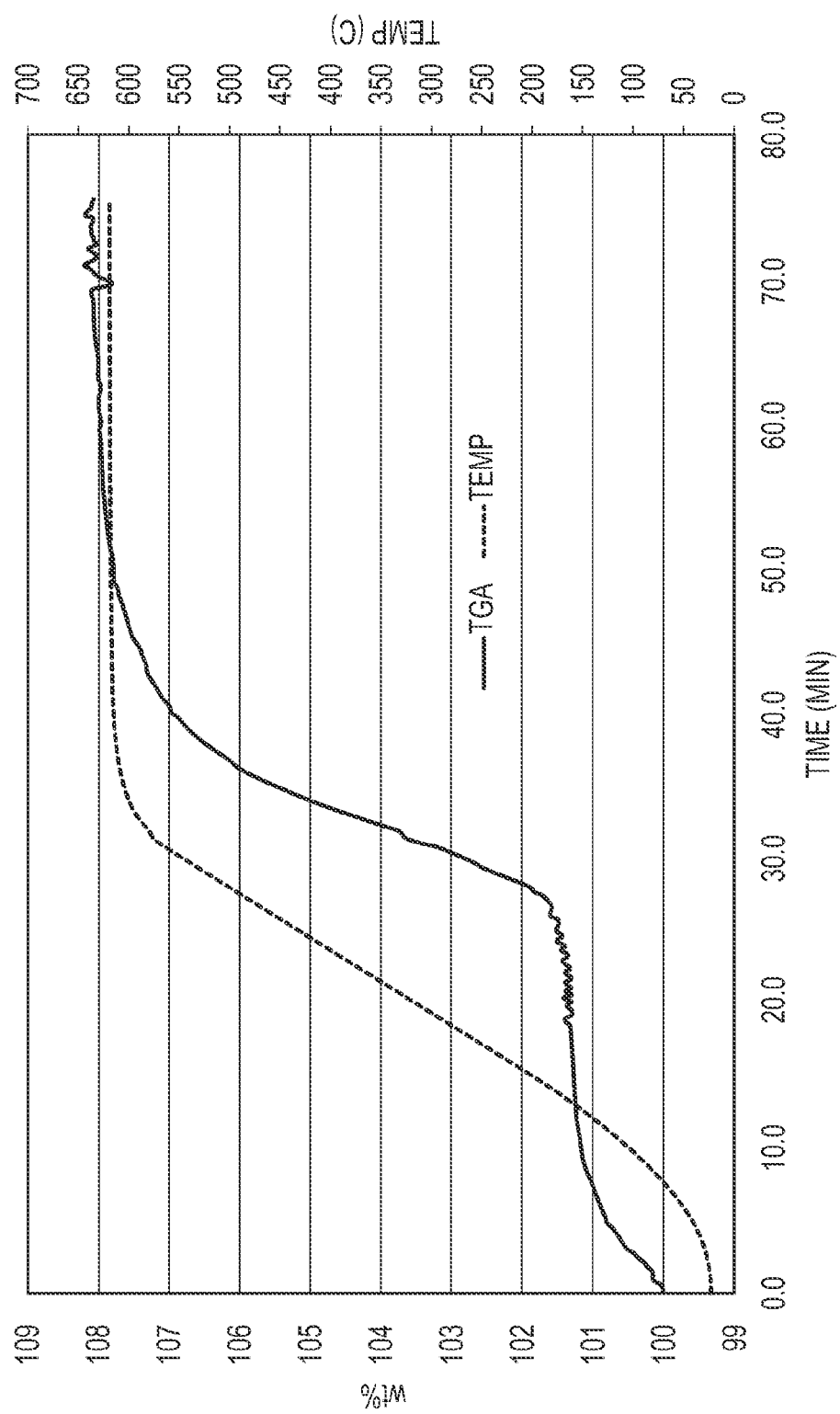
FIG. 5 illustrates Thermogravimetric Analysis (TGA) analysis of a CdTe/CdS sample.

A bulk sample of particles was screened to about minus 400 mesh. The mixture of CdTe and CdS particles was at a 14:1 ratio. Simultaneous Thermal Analysis (STA) was performed on the samples to optimize oxidation conditions. FIG. 4 illustrates Differential Scanning Calorimetry (DSC) analysis and FIG. 5 illustrates Thermogravimetric Analysis (TGA) analysis. The sample show that after about 25 minutes at about 650° C., a maximum about 8% mass gain occurred. Complete conversion to CdTeO3 corresponds to about 20 wt % increase, which indicates that oxidation was about 40%. Partial oxidation, as well as appearance of a second peak is evidence of surface oxidation with slow penetration rates. It will be understood by those in the art that the particle size and temperature will affect the oxidation of the samples.

Example 2

Figure 6:
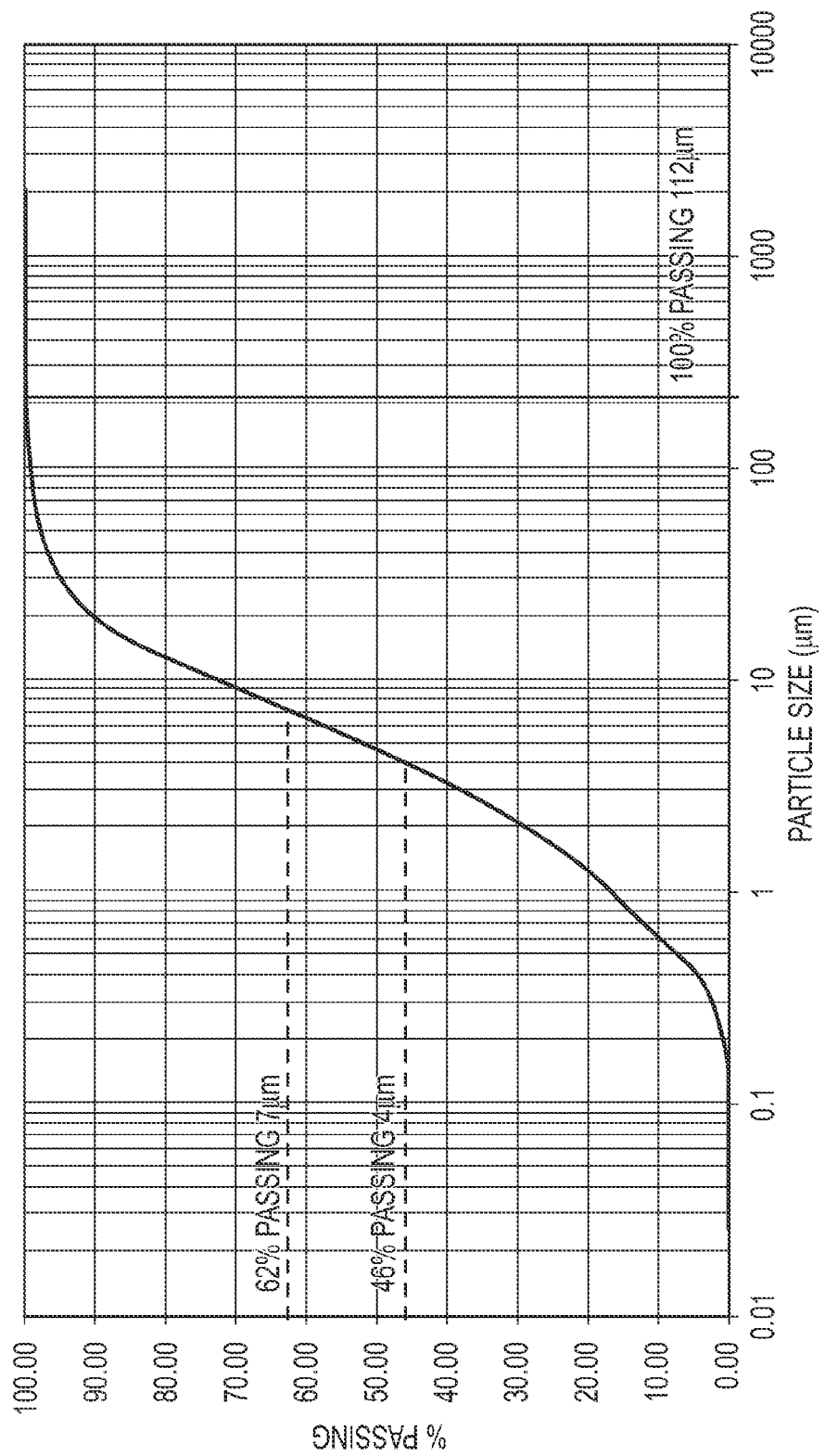
FIG. 6 illustrates a Microtrac analysis on bulk material.
Figure 7:
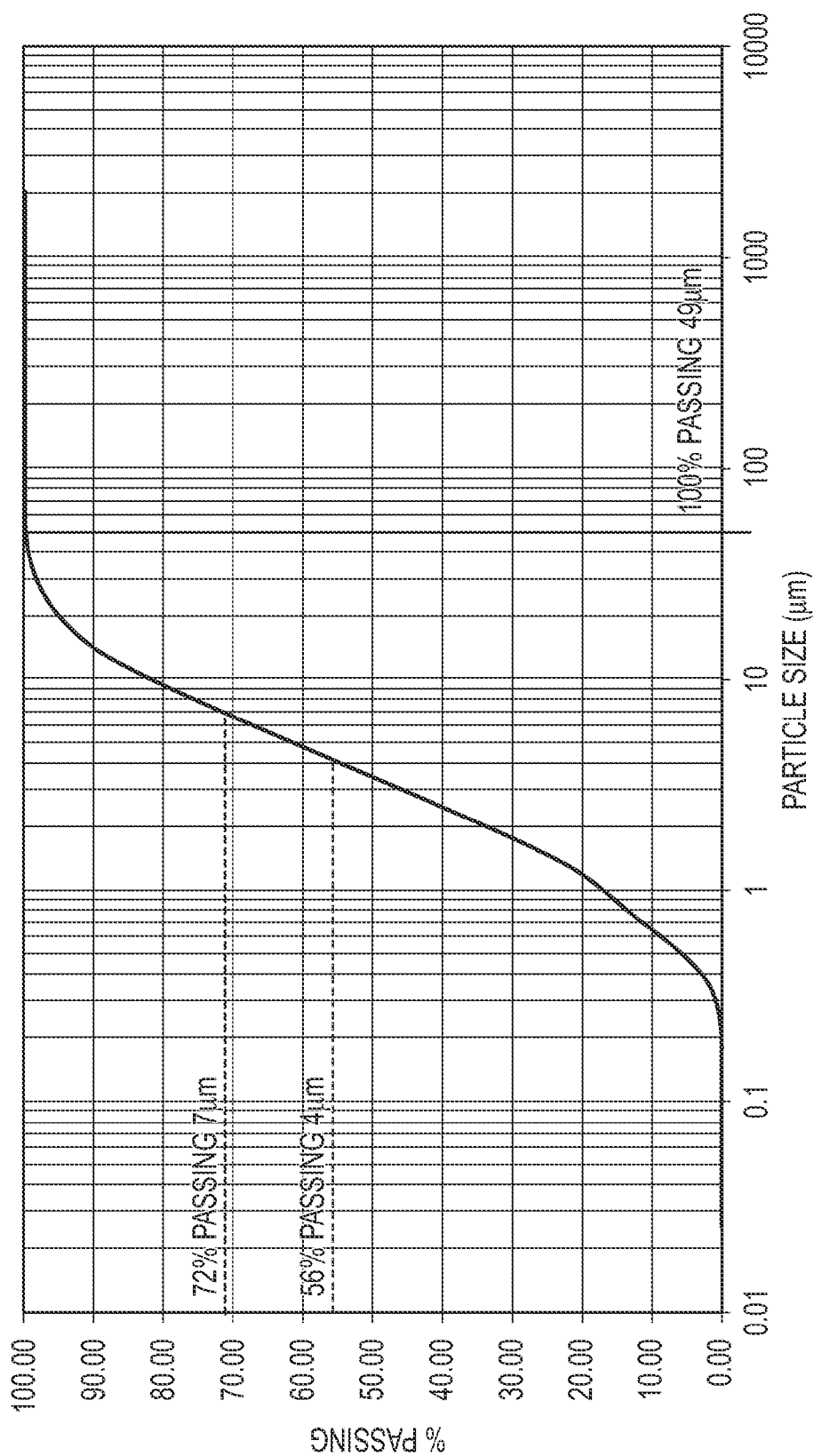
FIG. 7 illustrates a Microtrac analysis of a minus 400 mesh CdTe sample.
Figure 8:
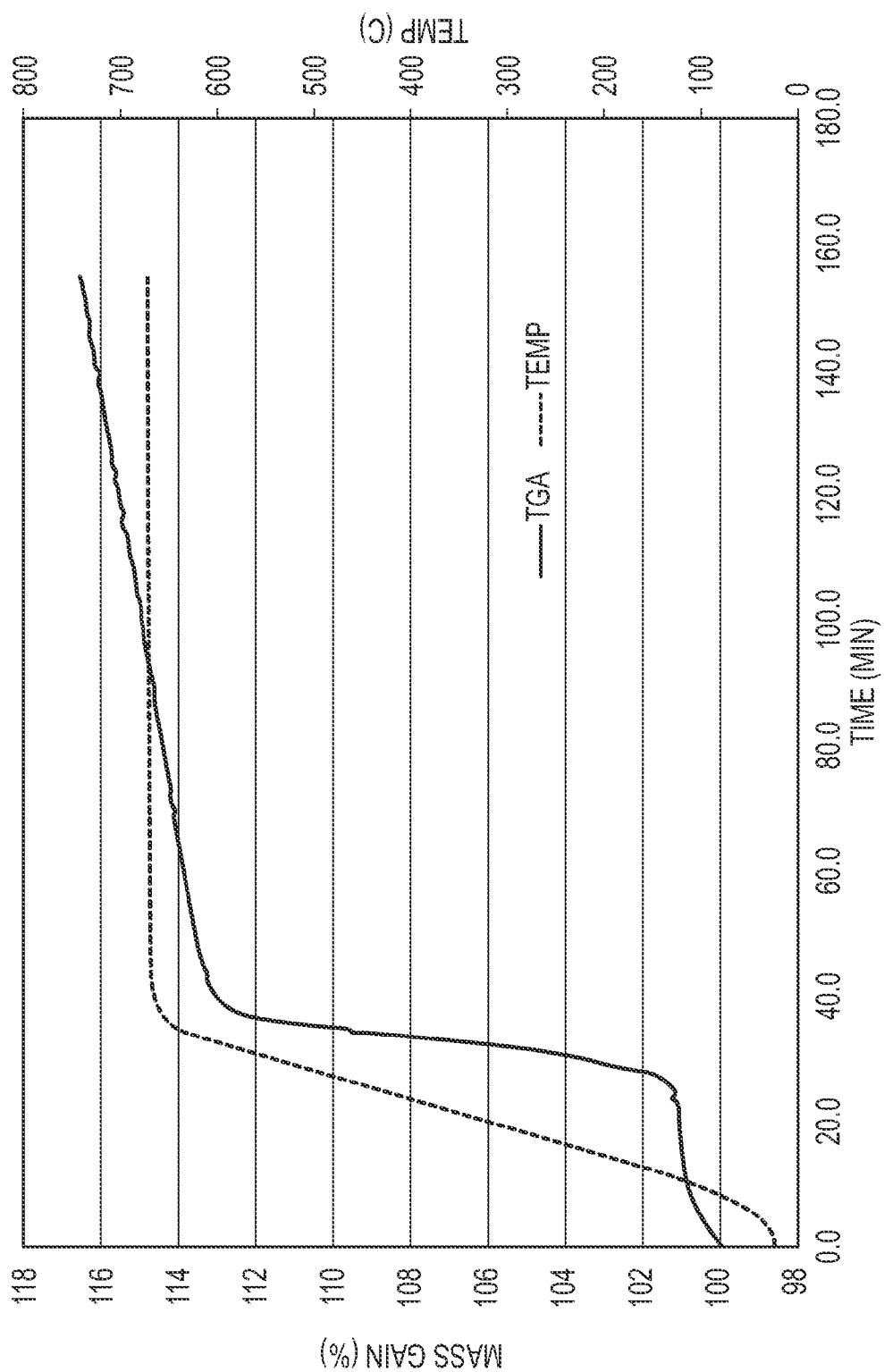
FIG. 8 illustrates a TGA analysis on screened material.
Figure 9:
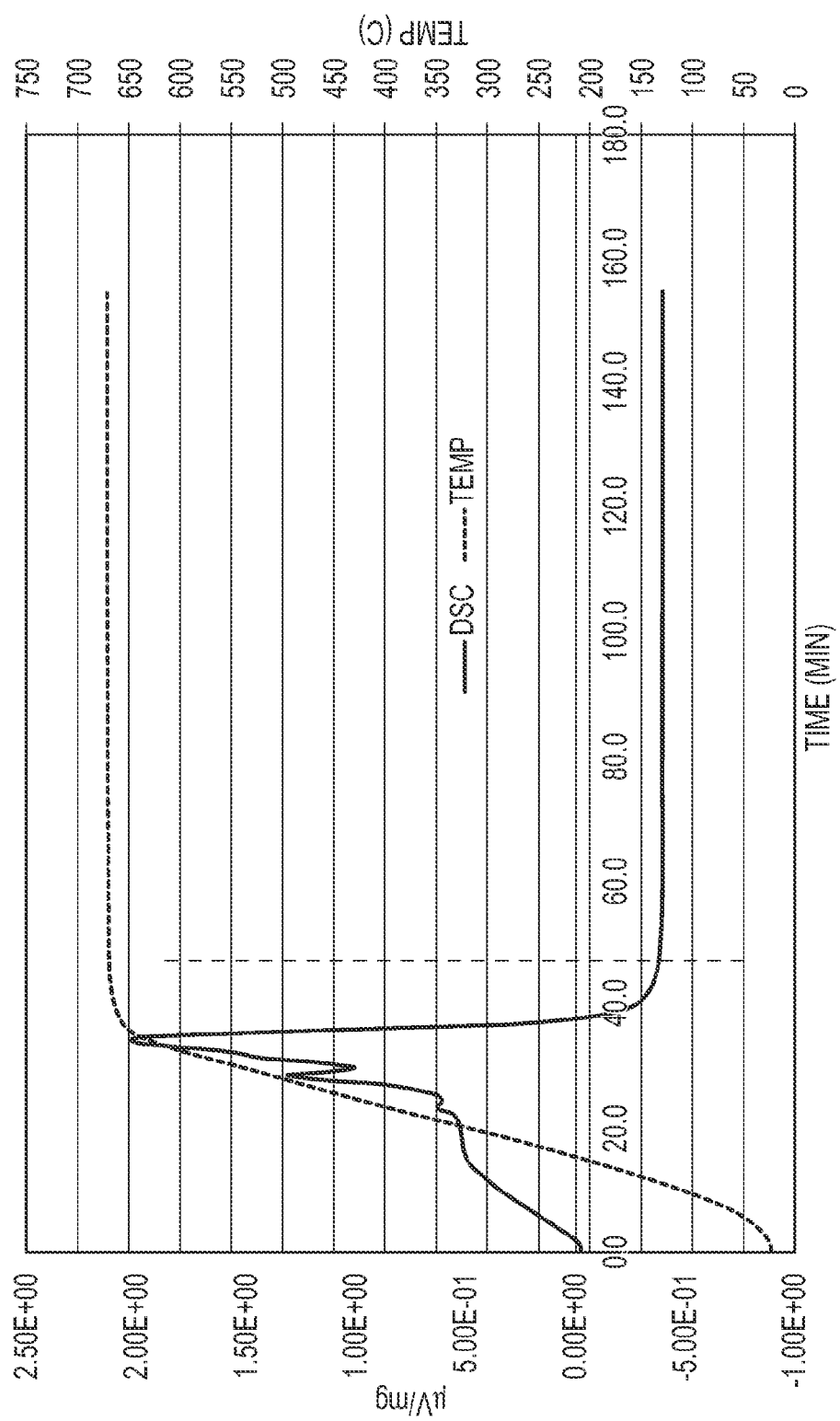
FIG. 9 illustrates a DSC on the screened material.

Example 2 illustrates the effect of particle size on oxidation. FIG. 6 illustrates a Microtrac analysis on bulk material. FIG. 6 illustrates that about 62% passing about 7 μm and a top size of about 112 μm. Wet screening may lower the top size and increase the percentage of particles passing at about 7 μm. FIG. 7 illustrates a Microtrac analysis on CdTe material screened to minus 400 mesh. About 72% of the material passes at about 7 μm and the largest particle size was about 49 μm. Thermal analysis was performed on the screened material. FIG. 8 illustrates a TGA analysis on the screened material. FIG. 9 illustrates a DSC analysis on the screened material. The TGA analysis and DSC analysis indicate that about 2 hours at about 700° C. is sufficient for about 17% mass gain and the oxidation onset remains around 475-500° C.

Example 3

Figure 10:
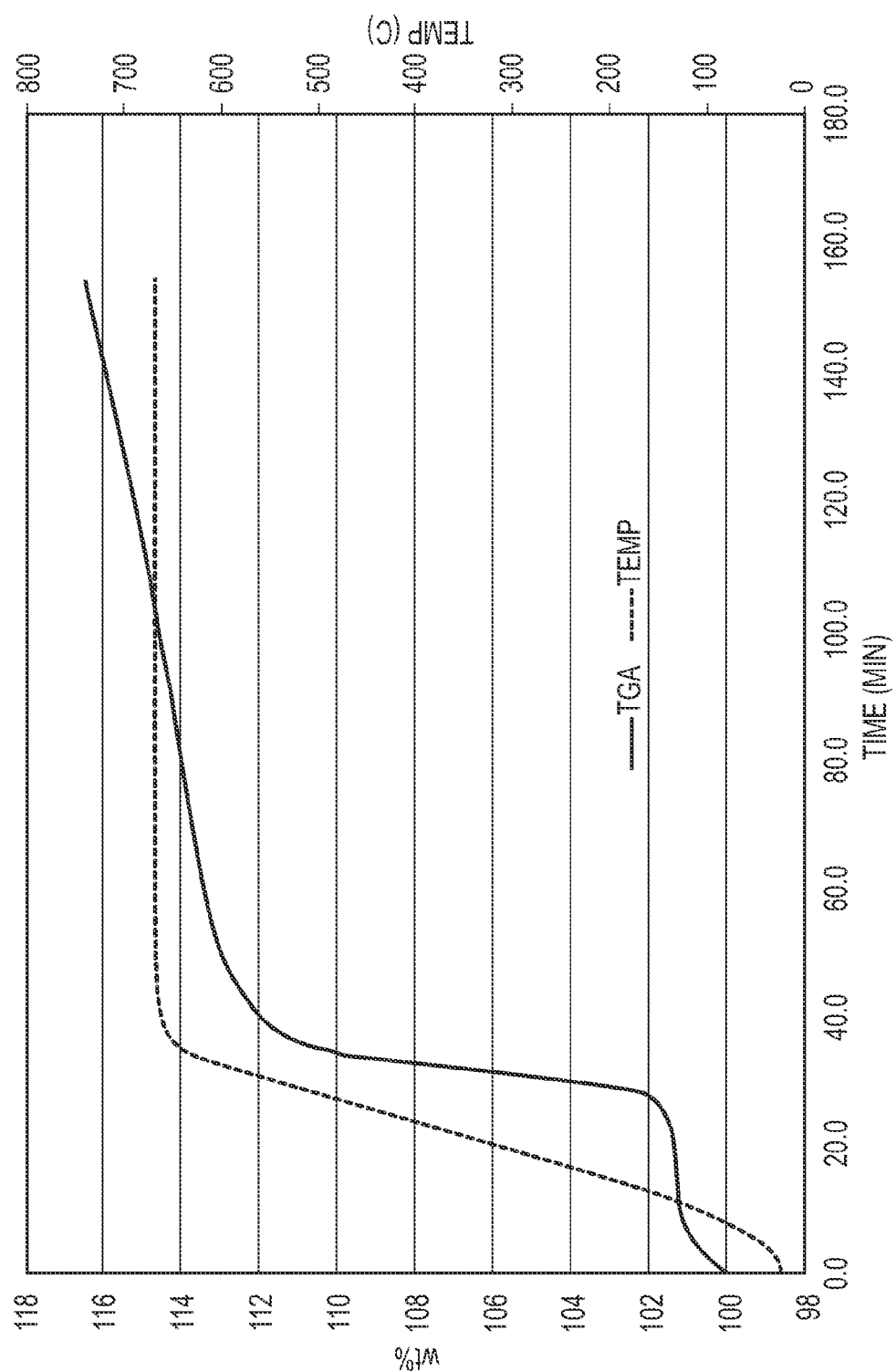
FIG. 10 illustrates a TGA analysis.
Figure 11:
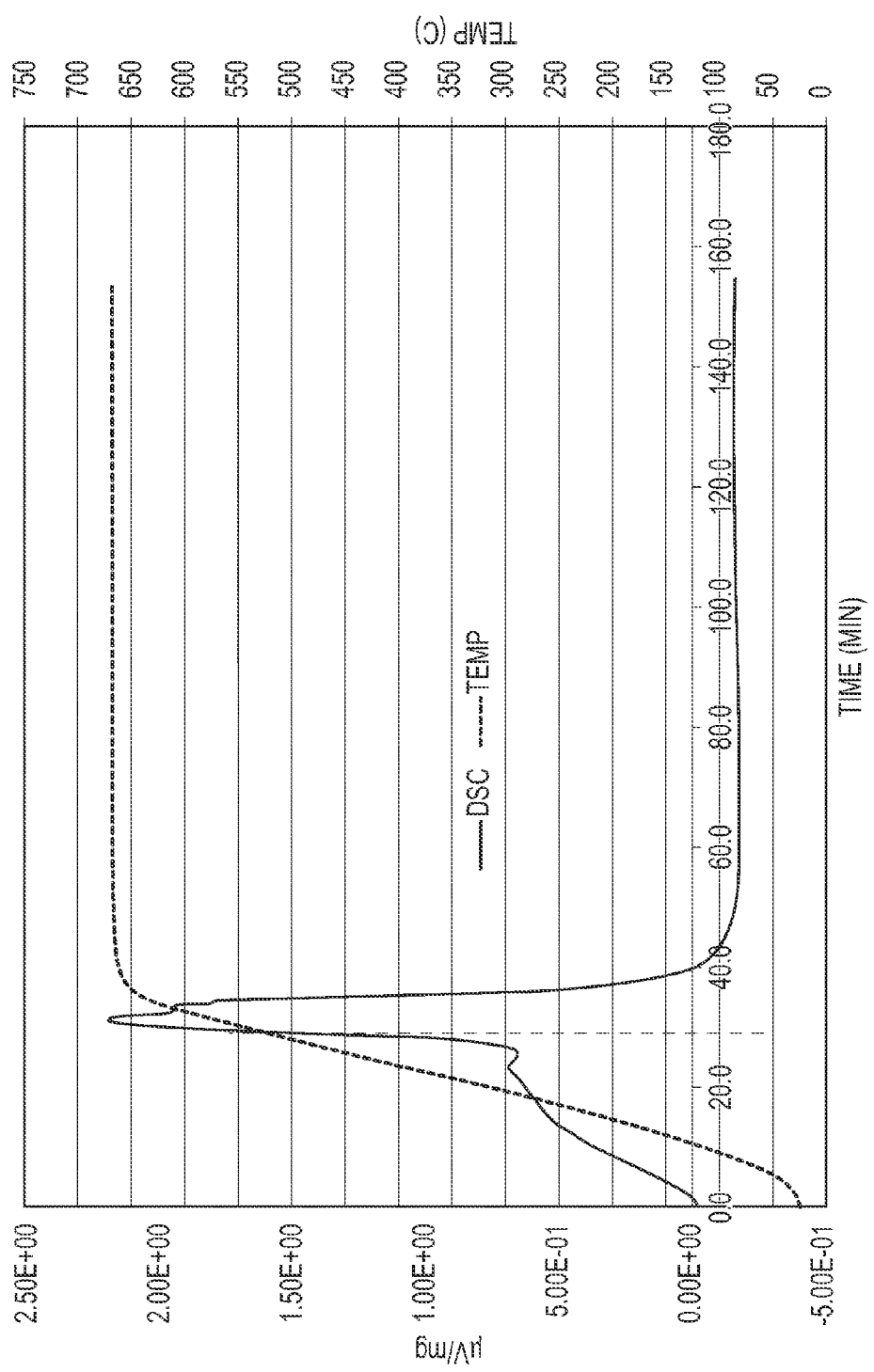
FIG. 11 illustrates a DSC analysis.

Example 3 illustrates thermal analysis on a mixed sample of CdTe and CdS. FIG. 10 illustrates a TGA analysis. FIG. 11 illustrates a DSC analysis. The mixed material shows identical oxidation response with a slightly more exothermic response compared to the CdTe screened samples. About 2 hours at about 700° C. is sufficient for about 17% mass gain and the oxidation onset remains around 475-500° C.

Example 4

Figure 12A:
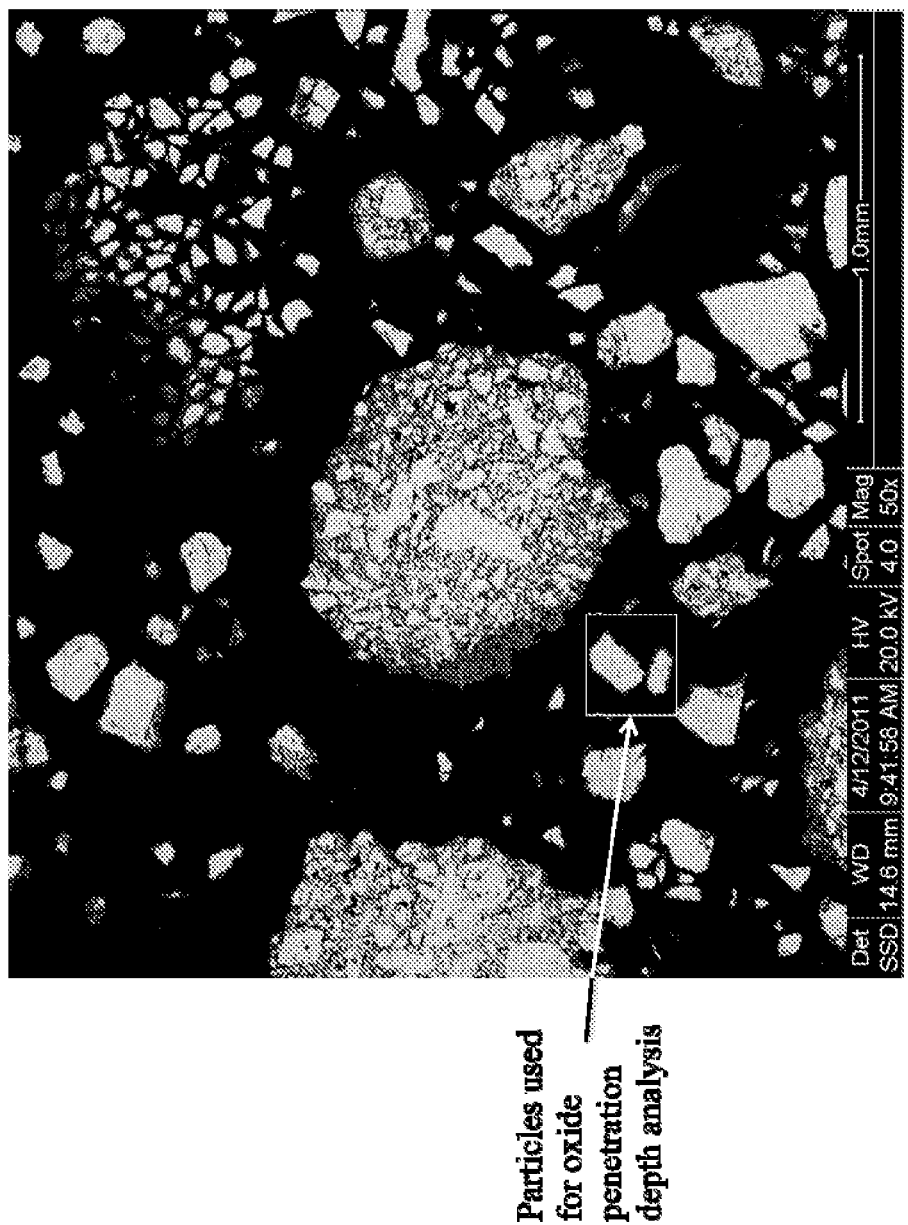
FIG. 12 illustrates a SEM analysis and oxide penetration depth analysis on a CdTe screened sample.
Figure 12B:
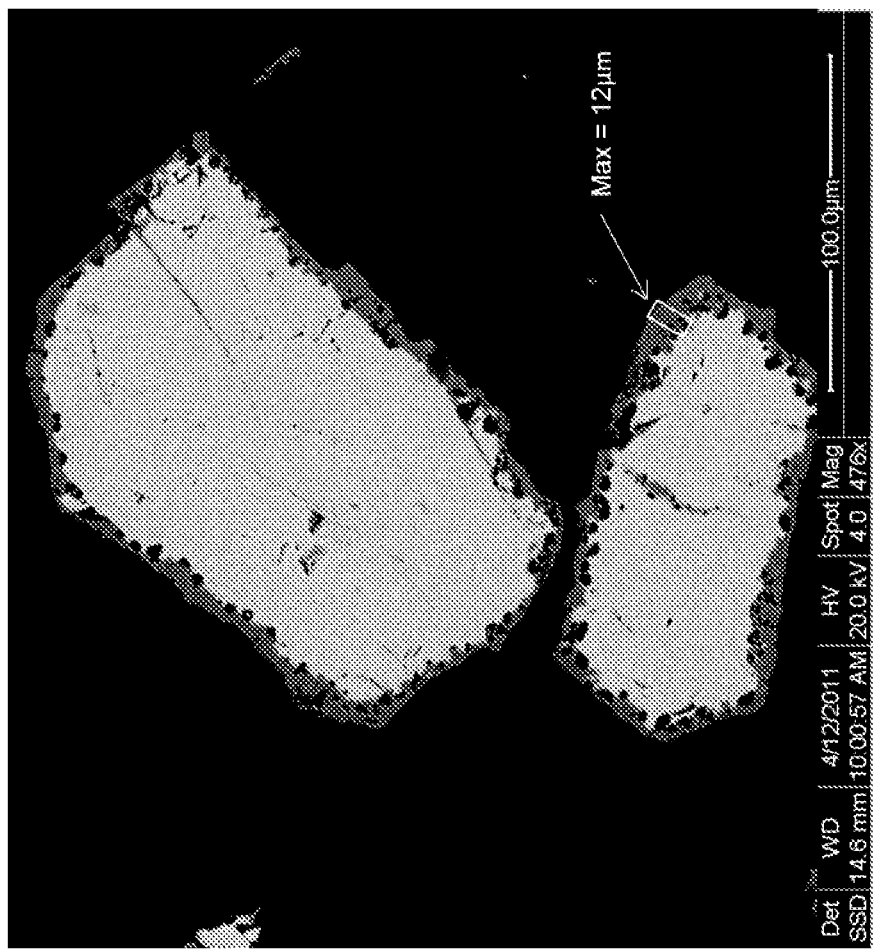

Example 4 illustrates oxidation testing on five samples. Two samples were pure CdTe screened to minus 400 mesh. Two samples were CdTe (screened) with CdS at 14:1 ratio. One sample was CdTe screened to plus 325 mesh used for SEM images. The screened material showed a mass gain of about 19.5% corresponding to about 98% oxidation. The plus 325 sample showed mass gain of only about 5.9% or only about 30% complete oxidation. Example 4 illustrates that particle size has an effect on oxidation. A SEM analysis was performed on particles as illustrated in FIG. 12a. FIG. 12b illustrates the maximum oxide penetration depth of the sample. The maximum oxide penetration depth of the sample was about 12 μm.

Example 5

Example 5 illustrates alkaline leach testing on oxidized material. Four samples were tested (2CdTe, and 2CdTe mixed with CdS). Each sample tested was oxidized at about 700° C. for about 2 hours. ICP-OES used to confirm Te loss into leach solution and the Cd level was below the detectable level for all of the tests. Table 1 illustrates the sample, initial mass, oxidation percent, leaching conditions and overall Te extraction.

Sample 1 was screened CdTe (greater than about 400 mesh). Sample 1 was leached with about 100 g/L NaOH for about 2 hours at about 40° C. The pulp density was about 20 g/L. About 35.4% of the extracted material was Te (about 2.13 g).

Sample 2 was screened CdTe (greater than about 400 mesh). Sample 2 was leached with about 100 g/L NaOH for about 15 min at about 80° C. The pulp density was about 40 g/L. About 32.6% of the extracted material was Te (about 2.10 g).

Sample 3 was screened CdTe (greater than about 400 mesh) and CdS powder. Sample 3 was leached with about 100 g/L NaOH, about 2 hours at about 40° C. The pulp density was about 20 g/L and about 35.4% of the extracted material was Te (about 1.89 g).

Sample 4 was screened CdTe (greater than about 400 mesh) and CdS powder. Sample 4 was leached with about 100 g/L NaOH for about 15 min at about 80° C. The pulp density was about 100 g/L and about 20.6% of extracted material was Te (about 3.40 g).

Table 1 illustrates the initial mass, oxidation and overall Te extraction for the samples.

TABLE 1

| Sample | Initial Mass (g) | Oxidation[1] (%) | Overall Te Extraction[2] (%) |
|---|---|---|---|
| 1 | 5.0 | 99 | 80 |
| 2 | 5.4 | 97 | 73 |
| 3 | 5.4 | 98 | 71 |
| 4 | 15.0 | 89 | 46 |

[1]% Oxidation based on 20% mass gain being 100% oxidized
[2]Te in solution confirmed with ICP-OES Example 6

In another experiment, about 125 mL of leach liquor containing about 1.712 g Te in solution was placed into an electrowinning cell. The sample ran in the cell for about 5 hours at a current density of about 25 mA/cm$^2$. About 0.954 g Te was recovered at the cathode. Approximately 56% of the available Te was recovered in about 5 hours. Additives may increase the smoothness of the cathode deposition.

For clarity, the following is a list of components and the associated numbering used in the drawings.

| Component | Number |
|---|---|
| EOL PV Module | 102, 202, 302 |
| $N_2$ Furnace | 104, 204, 304 |
| Media Blasting | 106 |
| $O_2$ Furnace | 108, 208, 308 |
| Alkaline Leach | 110, 210, 310 |
| Solid - Liquid Separation | 112, 212, 312 |
| Te Electrowinning | 114, 214, 314 |
| Cd Recovery and Purification | 120, 220, 320 |
| Te Product | 118, 218, 318 |
| Cd Product | 122, 222, 322 |
| NaOH recycle | 116, 216, 316 |
| Comminution | 324 |

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of recycling coated substrates, comprising:
    subjecting a substrate comprising a thin film to an oxidation in an oxygen containing environment to produced an oxidized thin film;
    subjecting the oxidized thin film to an alkaline leach to produce a solid containing cadmium and a solution containing tellurium; and
    recovering tellurium from the solution containing tellurium.

2. The method of claim 1, wherein the recovering tellurium comprises electrowinning the solution containing tellurium.

3. The method of claim 2, wherein a current density is about 25 mA/cm2 in the electrowinning.

4. The method of claim 2, wherein the current density is between about 20 mA/cm2 and about 30 mA/cm2.

5. The method of claim 1, further comprising recovering cadmium from the solid containing cadmium.

6. The method of claim 5, wherein the recovering cadmium further comprises:
    subjecting the solid containing cadmium to an acid solution to produce a solution containing cadmium; and
    electrowinning the solution containing cadmium.

7. The method of claim 1, wherein the oxidation occurs at a temperature of between about 650° C. and about 750° C.

8. The method of claim 1, wherein a pulp density of the alkaline leach is between 10 g/L and 300 g/L.

9. The method of claim 1, wherein a leaching solution of the alkaline leach is NaOH.

10. A method of recycling a photovoltaic module comprising a substrate, a coating, and a secondary substrate, the method comprising:
    subjecting the photovoltaic module to delamination to remove the secondary substrate;
    subjecting the photovoltaic module to an oxidation in an oxygen containing environment to produced an oxidized coating;
    subjecting the oxidized coating to an alkaline leach to produce a solid containing cadmium and a solution containing tellurium; and
    recovering tellurium from the solution containing tellurium.

11. The method of claim 10, further comprising:
    following the delamination step, media blasting the photovoltaic module and removing the substrate.

12. The method of claim 10, wherein the recovering tellurium comprises electrowinning the solution containing tellurium.

13. The method of claim 12, wherein a current density is about 25 mA/cm2 in the electrowinning.

14. The method of claim 10, further comprising recovering cadmium from the solid containing cadmium.

15. The method of claim 14, wherein the recovering cadmium further comprises:
    subjecting the solid containing cadmium to an acid solution to produce a solution containing cadmium; and
    electrowinning the solution containing cadmium.

16. The method of claim 10, wherein the alkaline leach further comprises abrasion stripping.

17. The method of claim 10, further comprising subjecting the oxidized coating to comminution.

18. The method of claim 10, wherein the alkaline leach further comprises attrition scrubbing.

19. A method of recycling a photovoltaic module, comprising:
- subjecting the photovoltaic module to a delamination in a nitrogen furnace, wherein the photovoltaic module comprises a secondary substrate and a coated substrate;
- removing a secondary substrate from the coated substrate;
- subjecting the coated substrate to a media blast until a thin film is recovered;
- subjecting the thin film to an oxidation in an oxygen containing atmosphere furnace to produced an oxidized thin film;
- leaching the oxidized thin film in an alkaline leach to produce a sludge containing cadmium and a solution containing tellurium;
- recovering cadmium from the sludge containing cadmium to produce a cadmium product;
- electrowinning the solution containing tellurium to produce a tellurium product;
- recovering the alkaline leach; and
- recycling the recovered alkaline leach to the leaching step.

20. The method of claim 19, wherein the recovered alkaline leach is combined with new alkaline leach, and wherein the new alkaline leach is NaOH.

* * * * *